(12) United States Patent
Klemets

(10) Patent No.: US 8,520,678 B2
(45) Date of Patent: Aug. 27, 2013

(54) NETWORK BANDWIDTH MEASUREMENT

(75) Inventor: Anders E Klemets, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 214 days.

(21) Appl. No.: 13/089,249

(22) Filed: Apr. 18, 2011

(65) Prior Publication Data

US 2011/0194446 A1 Aug. 11, 2011

Related U.S. Application Data

(63) Continuation of application No. 12/144,633, filed on Jun. 24, 2008, now Pat. No. 7,948,887.

(51) Int. Cl.
*H04L 12/28* (2006.01)

(52) U.S. Cl.
USPC ............ 370/391; 370/232; 370/236; 370/231

(58) Field of Classification Search
USPC ................. 370/230, 232, 235, 234, 236, 231, 370/391; 348/192
See application file for complete search history.

(56) References Cited

U.S. PATENT DOCUMENTS

| | | | | |
|---|---|---|---|---|
| 6,038,216 | A | 3/2000 | Packer | 370/231 |
| 6,490,627 | B1 | 12/2002 | Kalra et al. | |
| 6,560,243 | B1 * | 5/2003 | Mogul | 370/468 |
| 6,754,200 | B1 | 6/2004 | Nishimura et al. | 370/349 |
| 6,894,974 | B1 * | 5/2005 | Aweva et al. | 370/230.1 |
| 6,957,267 | B2 * | 10/2005 | Awasthi | 709/232 |
| 7,047,312 | B1 * | 5/2006 | Aweya et al. | 709/235 |
| 7,116,636 | B2 | 10/2006 | Vernon | 370/232 |
| 7,296,295 | B2 | 11/2007 | Kellerman et al. | |
| 7,342,880 | B2 * | 3/2008 | Yanagihara et al. | 370/232 |
| 7,373,417 | B1 | 5/2008 | Abbasi et al. | 709/232 |
| 7,869,366 | B1 * | 1/2011 | Muppala et al. | 370/238 |
| 2001/0047517 | A1 | 11/2001 | Christopoulos et al. | |
| 2002/0114306 | A1 * | 8/2002 | Kuusinen et al. | 370/342 |
| 2003/0097461 | A1 * | 5/2003 | Barham et al. | 709/235 |
| 2003/0152032 | A1 * | 8/2003 | Yanagihara et al. | 370/236.1 |
| 2004/0054689 | A1 | 3/2004 | Salmonsen et al. | |
| 2005/0132264 | A1 | 6/2005 | Joshi et al. | |
| 2005/0138192 | A1 * | 6/2005 | Encarnacion et al. | 709/230 |
| 2005/0188407 | A1 | 8/2005 | van Beek et al. | 725/81 |
| 2005/0204393 | A1 | 9/2005 | Bopardikar et al. | |
| 2006/0114990 | A1 * | 6/2006 | Pak | 375/240.03 |
| 2006/0117379 | A1 | 6/2006 | Bennett et al. | |
| 2007/0036228 | A1 | 2/2007 | Tseng | 375/245 |
| 2007/0133405 | A1 * | 6/2007 | Bowra et al. | 370/230 |
| 2007/0237090 | A1 | 10/2007 | Kim et al. | |
| 2007/0294372 | A1 * | 12/2007 | Hlasny et al. | 709/219 |

OTHER PUBLICATIONS

Hossain, et al., "Multimedia Content Repurposing in Heterogeneous Network Environments", International Conference on Electrical and Computer Engineering, ICECE' 06, Dec. 19-21, 2006, Pages 4.

(Continued)

*Primary Examiner* — Ricky Ngo
*Assistant Examiner* — Dewanda Samuel
(74) *Attorney, Agent, or Firm* — L. Alan Collins; Collins & Collins Intellectual, LLC

(57) ABSTRACT

Technologies for measuring a data throughput rate of a link typically used for transferring media catalogs and media between a media provider and an UPnP Control Point.

20 Claims, 4 Drawing Sheets

(56) References Cited

OTHER PUBLICATIONS

Sung, et al., "UPnP Based Intelligent Multimedia Service Architecture for Digital Home Network", Proceedings of the Fourth IEEE Workshop on Software Technologies for Future Embedded and Ubiquitous Systems and Second International Workshop on Collaborative Computing, Integration, and Assurance (SEUS-WCCIA'06), IEEE Computer Society, IEEE, 2006, Pages 6, May 8, 2006.

Park, et al., "A Transparent Protocol Scheme Based on UPnP AV for Ubiquitous Home", vol. 4743, Springer-Verlag, 2007, pp. 153-162, Aug. 28-Sep. 1, 2007.

* cited by examiner

NETWORK BANDWIDTH MEASUREMENT

RELATED APPLICATION

This application is a continuation of, and claims priority to, U.S. application Ser. No. 12/144,633, filed Jun. 24, 2008, which is incorporated herein by reference in its entirety.

BACKGROUND

In recent years, new consumer electronics devices have been introduced that can connect to networks such as Local Area Networks ("LANs") and the like. Examples of such devices include printers, Digital Video Disk ("DVD") players, personal video recorders, etc. For it to be useful to connect a device, such as a printer, to a network, the device must be able to communicate with other devices on the network. There should be a common "language" or protocol that the devices can use to talk to each other, and a simple way for devices to find each other with as little human intervention as possible. Conventional Universal Plug and Play ("UPnP") provides for most of these needs.

UPnP defines a category of devices called Media Servers, and another category called Media Renderers, and a concept called a Control Point. A Control Point is an entity which can find UPnP devices and control them. UPnP Media Server devices typically transfer multimedia content (e.g., a digital representation of a movie) to a Media Renderer device. For example, a networked DVD player may be a Media Renderer and a PC-based server maybe a Media Server. The networked DVD player may have a built-in Control Point, which allows it to discover the Media Server and allows it to download a catalog of movies from the Media Server. The Control Point may initiate a streaming transfer of one the movies from the Media Server to the Media Renderer so that it can be shown on a screen (e.g., a TV set) that the Media Renderer is attached to.

UPnP does not specify the format of the multimedia content (the movie in the previous example). However, UPnP does specify how a Media Server device can offer multiple representations of the same content, allowing the Control Point to choose a representation which is suitable for the Media Renderer. For example, the networked DVD player might only be able to play movies which are encoded using Moving Picture Experts Group ("MPEG")-2 compression. If a movie file which is stored on the server is encoded using Windows Media Video ("WMV") compression, then the DVD player will only be able to play the movie if the server can offer the movie in MPEG-2 format. Converting the movie from one format to another is called "transcoding". The quality of the images (or sound) that has been transcoded can be inferior to that of the original non-transcoded content.

In the general case, a Media Renderer might support multiple formats, and a Media Server may offer a movie in several different formats. There may be only partial overlap between the set of formats offered and the set of formats supported by the Media Renderer. It is possible for a Media Server to offer multiple representations of the same content, and each representation might be encoded using the same compression format and only differ by the width and height, or only differ by the encoding bit rate, etc. Selecting a preferred representation may be impacted by the data throughput rate of the link over which the representation will flow from the Media Server to the Media Renderer.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for measuring a data throughput rate of a link typically use for transferring media catalogs and media between a media provider and an UPnP Control Point.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
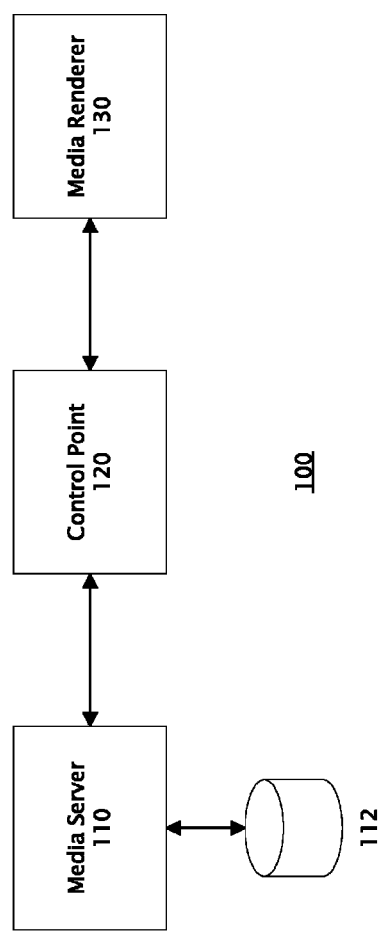
FIG. 1 is a block diagram showing an example media system.

FIG. 1 is a block diagram showing an example media system 100. Such a media system typically serves media from a Media Server 110 or the like, that may be stored in a data store 112 coupled to Media Server 110. The served media may be rendered on A Media Renderer 130 or the like. A Control Point 120 may operate to determine what media is available via the Media Server 110 and provide a selection of the available media to Media Renderer 130 for rendering. In one example, media system 100 may be based on the Universal Plug and Play ("UPnP") standard. Data store 112 may be one or more storage devices or the like operable to store digital media and or information about the digital media including metadata, catalogs, and the like. The Device or devices forming data store 112 may be distinct from and/or part of Media Server 110.

A Media Server 110 may also be referred to as a Digital Media Server ("DMS") or media provider and may be any device or system operable to store and/or provide digital media to media players and renderers such as Media Renderer 130. Examples of Media Server 110 include Personal Computers ("PCs"), servers, Network Attached Storage ("NAS") devices, etc.

A Media Renderer 130 may also be referred to as a Digital Media Renderer ("DMR") or a Digital Media Player ("DMP") or media player and may be any device or system operable to render and/or play digital media. Examples of Media Renderer 130 include televisions ("TVs"), stereos, home theatres, game consoles, video displays, remote speakers, etc. The term "target renderer" as used herein typically refers to a particular renderer that some media representation is to be rendered by. For example, a person's DVD player may be the target renderer for some representation of a digital video to be watched by the person.

A Control Point may also be referred to as a Digital Media Controller ("DMC") and may be any device operable to find media on Media Servers or the like and play the media on Media Renderers or the like. Control Point 120 may be included as an element of Media Renderer 130. For example, Control Point 120 may be included in a digital camera, PC, personal digital assistant ("PDA"), networked DVD player, networked music player, media player, etc.

The term "media" or "digital media" as used herein typically refers to digitized audio, video, images, or the like, or any combination thereof. The term "a media" typically refers to a specific image, video, audio, media composition, or the like. Generally a particular digital media is embodied as a computer file or files. Such a media is typically "coded" or "encoded" or "compressed" in some digital "format" such as, for example, the Moving Picture Experts Group ("MPEG") format or the Windows Media Video ("WMV") format or the like. Many different formats are available for encoding media and any such format is typically supported by the examples provided herein. Examples of media include a digital picture or photograph, a movie on a DVD, or a song on a Compact Disk ("CD"), etc. A "representation" of a media typically includes the media and may further embody media characteristics including a particular encoding bit rate, a particular height and width, and indication as to whether or not the representation has been transcoded, the name (or other identifier) of the encoding format used to create the representation, protocols support for transferring the representation, etc. Other characteristics may alternatively or additionally be embodied in a representation of a media. Some or all of these media characteristics may be referred to herein as "media metadata" or "metadata". Such metadata may be available in connection with a media (e.g., as part of a media file) or independent of the media (e.g., as part of a catalog or the like of available media).

Another example characteristic of a media representation is a conventional Digital Living Network Alliance ("DLNA") Profile Identifier ("ID"). A DLNA Profile ID may specify and/or describe several media characteristics such as those described above and/or including encoding format, frame rate, bit rate, etc.

The term "transcoding" as used herein typically refers to the convention process of converting a media from one format to another. For example, a digital audio media may be transcoded from Windows Media Audio ("WMA") format to MP3 format (MPEG-1 Audio Layer 3, or "MP3"). Such digital-to-digital conversion is typically lossy and typically results in a transcoded media of lesser quality than the original. On the other hand, transcoded media may be much smaller in size (number of bytes) than the original media, thus easier to store and/or transfer.

Figure 2:
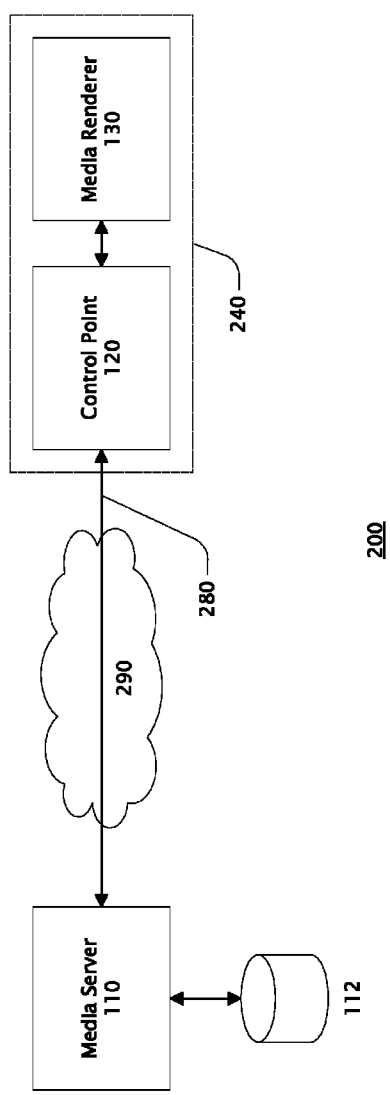
FIG. 2 is a block diagram showing another example media system.

FIG. 2 is a block diagram showing another example media system 200. Media system 200 may be comprised of the same Media Server 110, Data store 112, Control Point 120, and Media Renderer 130 as shown in FIG. 1, but may be coupled differently. For example, Control Point 120 and Media Renderer 130 may be combined into a single networked media device 240 such as a networked DVD player or the like. Device 240 may further be coupled to Media Server 110 via a link 280 over a network 290 such as the Internet, a wireless network, a wide area network ("WAN") or any other combination or type of network. Link 280 ("link") includes a data throughput characteristic—in this case a rate at which the link can transfer data from Media Server 110 to Media Renderer 130. Such a data throughput rate may be critical to know prior to selecting a media for rendering. For example, if the data throughput rate of link 280 ("link data throughput rate") is 128 kilobits per second ("kbps"), and the encoding bit rate of the selected representation is greater than 128 kbps, then attempting to stream the selected representation over link 280 for rendering will likely result in a poor rendering quality. The data throughput rate may not be of concern in a typical wired network or a high-speed wireless network. But the data throughput rate may be an issue with other types of networks including the Internet.

Control Points may download a media catalog or the like from a Media Server using a conventional UPnP ContentDirectory service. The Media Server implements the ContentDirectory service, and the Control Point invokes "actions" (similar to remote procedure calls) on the service to download the catalog. When a media file is transferred from the Media Server, it may not actually use UPnP, but rather the Hypertext Transfer Protocol ("HTTP") or the Real Time Streaming Protocol ("RTSP"). However, the HTTP and RTSP functionality tends to be co-located with the UPnP functionality, so the throughput of UPnP transfers are generally equivalent to the throughput of HTTP and RTSP transfers.

In one example, the UPnP ContentDirectory service is extended with a custom (nonconventional) action called "X_BandwidthTest" operable to estimate a data throughput rate over a link. Alternatively, the HTTP or RTSP protocols could be extended with similar functionality. The X_BandwidthTest action has one input parameter which is the number of bytes of data that should be included in a response. The Media Server's response to the action has one output parameter, which is a variable sized array of data. In general, the data returned by the Media Server in response to the action comprises random bytes. This may make the request and response hard to compress. Otherwise, any intermediate routers or the like on link 280 could compress the data which may alter the result of the rate estimate. However, if the action request and response to the UPnP ContentDirectory service are sent over an encrypted connection, then the data typically does not need to be random because the encryption tends to make all data appear random such that compression is generally not be possible.

In one example, the X_BandwidthTest action is defined using eXtensible Markup Language ("XML") as follows:

```
<action>
<name>X_BandwidthTest</name>
    <argumentList>
        <argument>
            <name>NumBytes</name>
            <direction>in</direction>
            <relatedStateVariable>A_ARG_TYPE_NumBytes</related
                StateVariable>
        </argument>
        <argument>
            <name>BandwidthData</name>
            <direction>out</direction>
            <relatedStateVariable>A_ARG_TYPE_BandwidthData</re
                latedStateVariable>
        </argument>
    </argumentList>
</action>
<stateVariable sendEvents="no">
    <name>A_ARG_TYPE_NumBytes</name>
    <dataType>ui4</dataType>
</stateVariable>
<stateVariable sendEvents="no">
    <name>A_ARG_TYPE_BandwidthData</name>
    <dataType>bin.base64</dataType>
</stateVariable>
```

Because UPnP is a text-based protocol, arbitrary data generally needs to be encoded using a Base64 encoding scheme or the like (well-known to those skilled in the art), which makes arbitrary binary data look like printable text. Such encoding generally increases the size of the data by approximately 33%. When the Media Server responds to the X_BandwidthTest action, in the typical case it will choose the size of the output parameter such that after Base64-encoding has been applied, the array of data being returned approximately matches the number of bytes specified by the Control Point in the input parameter. However, the Media Server may respond with a different amount of bytes that that specified by the input parameter. For example, if the Control Point asks for "too much" data, then the Media Server may choose to respond with data only up to a particular limit in size. The term "too much" in this example may be determined by considering how long the requested amount of data would take to send over a link with a particular data transfer rate, and/or by considering how much memory may be required by a media server to satisfy the request, and/or based on the difference between encoding rates of media representations available from a media server relative to an estimated data transfer rate of a link over which they may be transferred. In one example, this limit is 1 megabyte ("MB").

Figure 3:
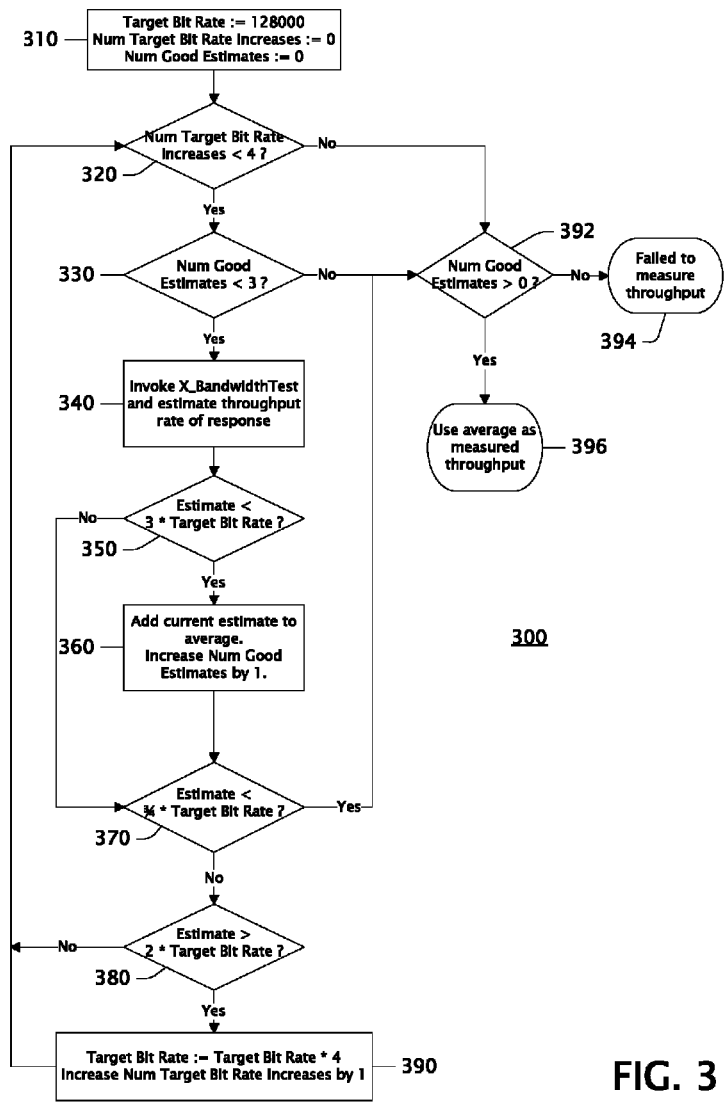
FIG. 3 is a block diagram showing an example method for measuring a data throughput rate over a link.

FIG. 3 is a block diagram showing an example method 300 for measuring a data throughput rate over a link such as link 280 of FIG. 2. Method 300 makes use of a "Target Bit Rate" wherein the Control Point typically requests only as much data as would take approximately 2 seconds to transfer at the Target Bit Rate. Initially, the Control Point may not have any idea of what the link's data throughput rate might be. So, in one example, it performs a bandwidth test starting with a Target Bit Rate of 128 kbps. In this example, the Control Point invokes the X_BandwidthTest action, asking the Media Server to transfer 32 kilobytes ("kB") of data. The number 32 kB is derived from the Target Bit Rate because it should take approximately 2 seconds to transfer 32 kB of data give a data throughput rate of 128 kbps. When the Control Point receives the response, it measures how long it took for the response to be received, thus determining an estimate of the data throughput rate of the link between the Media Server and the Control Point.

In one example, if the data throughput rate is estimated to be much higher than (e.g., more than twice as high as) the Target Bit Rate, then the Target Bit Rate is typically quadrupled, and the bandwidth test repeated. The Target Bit Rate is increased because, if the data throughput rate is high compared to the Target Bit Rate, an estimate tends to be increasingly accurate when transferring larger amounts of data. If the estimated data throughput rate is less than three times the Target Bit Rate, method 300 typically considers the estimate a good measurement. Method 300 typically attempts to make three good estimates and use the average of the three as the measured data throughput rate. Method 300 typically stops when three good estimates have been obtained, or when the Target Bit Rate has been increased four times. Method 300 may also stop if any of the estimates result in a data throughput rate that is less than three-fourths of the Target Bit Rate. Slower data throughput rates are generally measured more accurately than faster rates, so there may be less need to collect additional estimates for the measurement in such cases. Also, when the rate is slower, more time may be spent performing the measurement and collecting additional estimates may increase the amount of time that a user must wait for the data throughput rate to be measured. In alternative examples, other values can be used.

Referring to the blocks of FIG. 3, blocks 310 through 396 detail example method 300 for measuring a data throughput rate. Block 310 typically indicates initializing three example variables at the beginning of example method 300. Target Bit Rate is typically initialized to 128,000 representing 128 kbps. Num Target Bit Rate Increases is typically initialized to zero, and Num Good Estimates is generally initialized to zero. Once initialized, method 300 typically continues at block 320.

Block 320 typically indicates checking if Num Target Bit Rate Increases is less than 4, indicating that the Target Bit Rate may be further increased for a measurement. If the value is less than 4, the method 300 typically continues at block 330; otherwise method 300 typically continues at block 392.

Block 330 typically indicates checking if Num Good Estimates is less than 3, indicating that more good estimates may be needed for a final measurement. If the value is less than 3, then method 300 typically continues at block 340; otherwise method 300 typically continues at block 392.

Block 340 typically indicates making an estimate of the link's data throughout rate. In one example, this is done by invoking the X_BandwidthTest action and waiting for the response to estimate the data throughput rate. Once the data throughput rate has been estimated, then method 300 typically continues at block 350.

Block 350 typically indicates checking if the estimated data throughput rate is less than three times the Target Bit Rate, indicating a good estimate. If the estimated data throughput rate is less than three times the Target Bit Rate, then method 300 typically continues at block 360; otherwise method 300 typically continues at block 392.

Block 360 typically indicates averaging the current estimate with any other good estimates and incrementing Num Good Estimates by 1, indicating that another good estimate has been obtained. In one example, a running average of all good estimates is maintained. The average may be calculated as the sum of the estimates divided by the number of estimates. Or the average may be calculated as the sum of the current estimate and the average of previous estimates, this sum divided by two. In another example, the average may be a median value of the estimates. Other techniques may alternatively or additionally be used to calculate an average or the like. Once completed, method 300 typically continues at block 370.

Block 370 typically indicates checking if the estimated data throughput rate is less than three quarters of Target Bit Rate, indicating sufficient accuracy of the estimate. If the estimated data throughput rate is less than three quarters of Target Bit Rate then method 300 typically continues at block 392; otherwise method 300 typically continues at block 380.

Block 380 typically indicates checking if the estimated data throughput rate is greater than two times the Target Bit Rate, indicating that the Target Bit Rate can be increased. If the estimated data throughput rate is greater than two times the Target Bit Rate then method 300 typically continues at block 390; otherwise method 300 typically continues at block 320.

Block 390 typically indicates increasing the Target Bit Rate and incrementing Num Target Bit Rate Increases by 1. In one example, Target Bit Rate is multiplied by four. Once complete, method 300 typically continues at block 320.

Block 392 typically indicates checking if Num Good Estimates is greater than zero, indicating that at least one good estimate has been obtained. If Num Good Estimates is greater than zero then method 300 typically continues at block 396; otherwise method 300 typically continues at block 394.

Block 394 typically indicates that no good estimates have been obtained, indicating failure to successfully measure the link's data throughput rate. At this point, method 300 is typically complete.

Block 396 typically indicates success in measuring the link's data throughput rate. In one example, the current average of good estimates is the data throughput rate measurement. At this point, method 300 is typically complete.

In one example, method 300 may include the Control Point invoking the X_BadwidthTest action on the Media Server by sending it as a POST request via HTTP or HTTP over Secure Socket Layer ("HTTPS"). The corresponding response from the Media Server typically includes HTTP or HTTPS headers and the like followed by an XML-format message body including the array of data. The Control Point typically processes the headers first. When the Control Point receives the first part of the XML-format message body, it sets a variable X to the number of bytes from the message body that has been received so far. Further, the Control Point also sets a variable $T_1$ to the current time. When the Control Point receives the final part of the message body, it sets a variable Y to the total number of bytes of the message body that have been received. Further, the Control Point also sets a variable $T_2$ to the current time. An estimate of the data throughput rate is then calculated as $r=(Y-X)/(T_2-T_1)$. Further, the value of $(T_2-T_1)$ is converted to units of seconds and r is multiplied by 8 resulting in an estimated data throughput rate r in bits per second ("bps"). If $T_2=T_1$ or if Y=X then the rate is too high to measure, and the rate r is set to a number greater than three times the Target Bit Rate.

Figure 4:
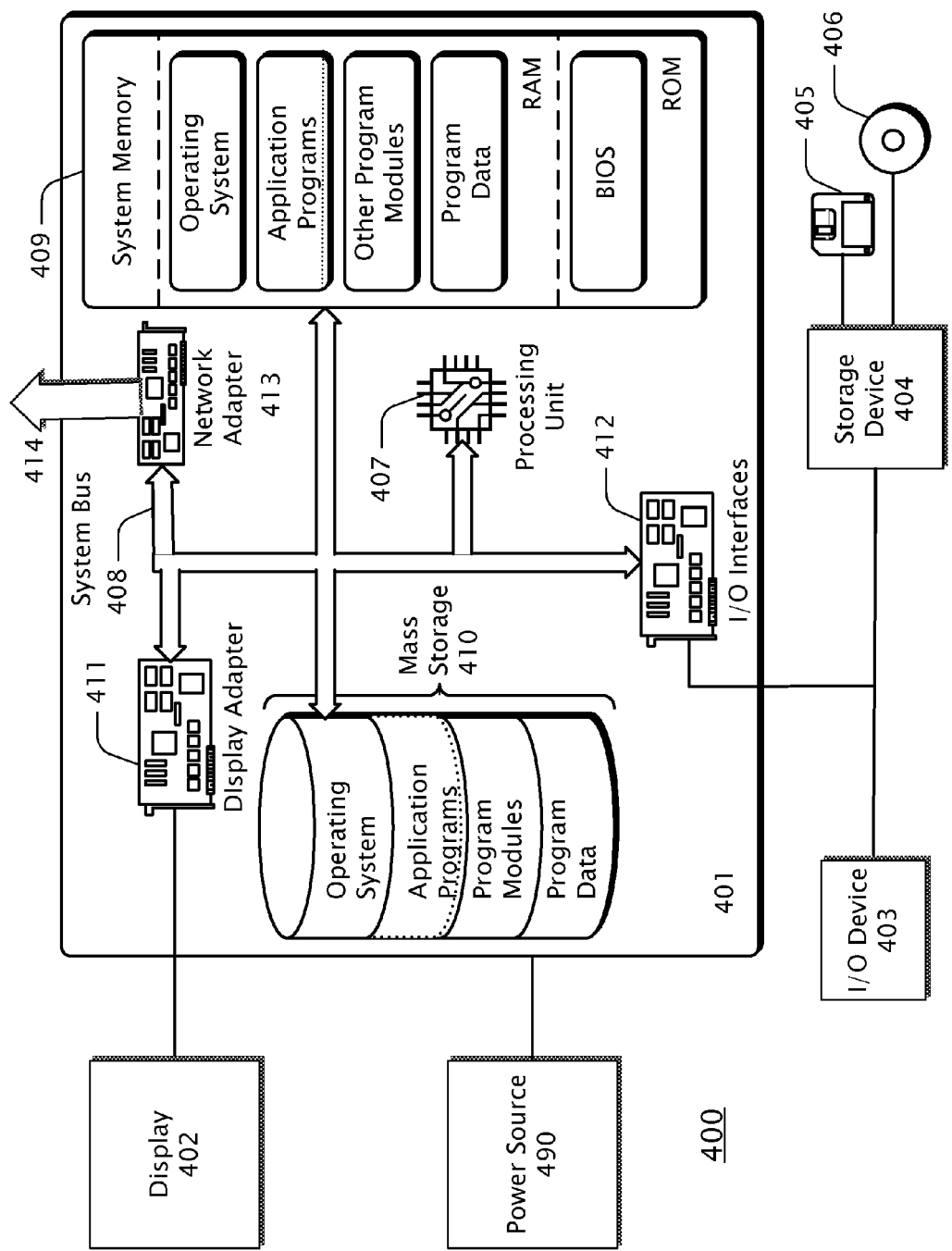
FIG. 4 is a block diagram showing an example computing environment 400 in which the technologies described herein may be implemented.

FIG. 4 is a block diagram showing an example computing environment 400 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 400 typically includes a general-purpose computing system in the form of a computing device 401 coupled to various components, such as peripheral devices 402, 403, 404 and the like. System 400 may couple to various other components, such as input devices 403, including voice recognition, touch pads, buttons, keyboards and/or pointing devices, such as a mouse or trackball, via one or more input/output ("I/O") interfaces 412. The components of computing device 401 may include one or more processors (including central processing units ("CPU"), graphics processing units ("GPU"), microprocessors ("µP"), and the like) 407, system memory 409, and a system bus 408 that typically couples the various components. Processor 407 typically processes or executes various computer-executable instructions to control the operation of computing device 401 and to communicate with other electronic and/or computing devices, systems or environment (not shown) via various communications connections such as a network connection 414 or the like. System bus 408 represents any number of several types of bus structures, including a memory bus or memory controller, a peripheral bus, a serial bus, an accelerated graphics port, a processor or local bus using any of a variety of bus architectures, and the like.

System memory 409 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 409 typically stores data, computer-executable instructions and/or program modules comprising computer-executable instructions that are immediately accessible to and/or presently operated on by one or more of the processors 407.

Mass storage devices 404 and 410 may be coupled to computing device 401 or incorporated into computing device 401 via coupling to the system bus. Such mass storage devices 404 and 410 may include non-volatile RAM, a magnetic disk drive which reads from and/or writes to a removable, non-volatile magnetic disk (e.g., a "floppy disk") 405, and/or an optical disk drive that reads from and/or writes to a non-volatile optical disk such as a CD ROM, DVD ROM 406. Alternatively, a mass storage device, such as hard disk 410, may include non-removable storage medium. Other mass storage devices may include memory cards, memory sticks, tape storage devices, and the like.

Any number of computer programs, files, data structures, and the like may be stored on computer readable media, mass storage 410, other storage devices 404, 405, 406, and system memory 409 (typically limited by available space) including, by way of example and not limitation, operating systems, application programs, data files, directory structures, computer-executable instructions, and the like. The term "computer readable media" as used herein (as opposed to "communications media") refers to any storage device or medium (e.g., 404, 405, 406, 409, and 410) that is a statutory article of manufacture configured for storing computer-executable instructions, but that is not a signal or carrier wave per se.

Output components or devices, such as display device 402, may be coupled to computing device 401, typically via an interface such as a display adapter 411. Output device 402 may be a liquid crystal display ("LCD"). Other example output devices may include printers, audio outputs, voice outputs, cathode ray tube ("CRT") displays, tactile devices or other sensory output mechanisms, or the like. Output devices may enable computing device 401 to interact with human operators or other machines, systems, computing environments, or the like. A user may interface with computing environment 400 via any number of different I/O devices 403 such as a touch pad, buttons, keyboard, mouse, joystick, game pad, data port, and the like. These and other I/O devices may be coupled to processor 407 via I/O interfaces 412 which may be coupled to system bus 408, and/or may be coupled by other interfaces and bus structures, such as a parallel port, game port, universal serial bus ("USB"), fire wire, infrared ("IR") port, and the like.

Computing device 401 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 401 may be coupled to a network via network adapter 413 or the like, or, alternatively, via a modem, digital subscriber line ("DSL") link, integrated services digital network ("ISDN") link, Internet link, wireless link, or the like.

Communications connection 414, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 490, such as a battery or a power supply, typically provides power for portions or all of computing environment 400. In the case of the computing environment 400 being a mobile device or portable device or the like, power source 490 may be a battery. Alternatively, in the case computing environment 400 is a desktop computer or server or the like, power source 490 may be a power supply designed to connect to an alternating current ("AC") source, such as via a wall outlet.

Some mobile devices may not include many of the components described in connection with FIG. 4. For example, an electronic badge may be comprised of a coil of wire along with a simple processing unit 407 or the like, the coil configured to act as power source 490 when in proximity to a card reader device or the like. Such a coil may also be configure to act as an antenna coupled to the processing unit 407 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 402, I/O device 403, or many of the other components described in connection with FIG. 4. Other mobile devices that may not include many of the components described in connection with FIG. 4, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device, the method for measuring and returning a throughput rate of a link, the method comprising:

estimating, based on a fifth value derived from a target bit rate, a data throughput rate of a plurality of estimated data throughput rates;

calculating, in response to the estimated data throughput rate being less than a first value and based on the estimated throughput rate, an average data throughput rate of a plurality of calculated average throughput rates;

considering, in response to the estimated data throughput rate being less than the first value, the estimated data throughput rate to be a good measurement;

returning, in response to at least one good measurement and in response to the estimated data throughput rate being less than a second value, the calculated average data throughput rate as the throughput rate of the link;

increasing the target bit rate by a third value in response to the estimated data throughput rate not being less than the second value and in response to the estimated data throughput rate being greater than a fourth value;

repeating the method in response to the increasing or to the estimated data throughput rate not being greater than the fourth value, and further in response to the increasing being performing less than a particular number of times, and further in response to less than a particular number of good measurements.

2. The method of claim 1 wherein the estimated data throughput rate is based on an actual amount of time required to transfer a number of bytes over the link, the number of transferred bytes determined based on the target bit rate.

3. The method of claim 1 wherein the first value is no more than three times the target bit rate.

4. The method of claim 1 wherein the second value is less than the target bit rate.

5. The method of claim 1 wherein the third value is greater than zero.

6. The method of claim 1 wherein the fourth value is greater than the target bit rate.

7. The method of claim 1 wherein the target bit rate represents a number of bits per second.

8. At least one computer readable media storing computer-executable instructions that, when executed by a computer, cause the computer to perform a method for measuring and returning a throughput rate of a link, the actions comprising:

estimating, based on a fifth value derived from a target bit rate, a data throughput rate of a plurality of estimated data throughput rates;

calculating, in response to the estimated data throughput rate being less than a first value and based on the estimated data throughput rate, an average data throughput rate of a plurality of calculated average throughput rates;

considering, in response to the estimated data throughput rate being less than the first value, the estimated data throughput rate to be a good measurement;

returning, in response to at least one good measurement and in response to the estimated data throughput rate being less than a second value, the calculated average data throughput rate as the throughput rate of the link;

increasing the target bit rate by a third value in response to the estimated data throughput rate not being less than the second value and in response to the estimated data throughput rate being greater than a fourth value;

repeating the method in response to the increasing or to the estimated data throughput rate not being greater than the fourth value, and further in response to the increasing being performing less than a particular number of times, and further in response to less than a particular number of good measurements.

9. The at least one computer readable media of claim 8 wherein the estimated data throughput rate is based on an actual amount of time required to transfer a number of bytes over the link, the number of transferred bytes determined based on the target bit rate.

10. The at least one computer readable media of claim 8 wherein the first value is no more than three times the target bit rate.

11. The at least one computer readable media of claim 8 wherein the second value is less than the target bit rate.

12. The at least one computer readable media of claim 8 wherein the third value is greater than zero.

13. The at least one computer readable media of claim 8 wherein the fourth value is greater than the target bit rate.

14. The at least one computer readable media of claim 8 wherein the target bit rate represents a number of bits per second.

15. A computing device and at least one program module together configured for performing actions for measuring and returning a throughput rate of a link, the actions comprising:

estimating, based on a fifth value derived from a target bit rate, a data throughput rate of a plurality of estimated data throughput rates;

calculating, in response to the estimated data throughput rate being less than a first value and based on the estimated data throughput rate, an average data throughput rate of a plurality of calculated average throughput rates;

considering, in response to the estimated data throughput rate being less than the first value, the estimated data throughput rate to be a good measurement;

returning, in response to at least one good measurement and in response to the estimated data throughput rate being less than a second value, the calculated average data throughput rate as the throughput rate of the link;

increasing the target bit rate by a third value in response to the estimated data throughput rate not being less than the second value and in response to the estimated data throughput rate being greater than a fourth value;

repeating the method in response to the increasing or to the estimated data throughput rate not being greater than the fourth value, and further in response to the increasing being performing less than a particular number of times, and further in response to less than a particular number of good measurements.

16. The computing device and the at least one program module of claim 15 wherein the estimated data throughput rate is based on an actual amount of time required to transfer a number of bytes over the link, the number of transferred bytes determined based on the target bit rate.

17. The computing device and the at least one program module of claim 15 wherein the first value is no more than three times the target bit rate.

18. The computing device and the at least one program module of claim 15 wherein the second value is less than the target bit rate.

19. The computing device and the at least one program module of claim 15 wherein the third value is greater than zero.

20. The computing device and the at least one program module of claim 15 wherein the fourth value is greater than the target bit rate.

* * * * *